March 15, 1960 F. A. LEISEY 2,928,774
AUTOMATIC TITRATION SYSTEM
Filed Aug. 31, 1953 3 Sheets-Sheet 1

INVENTOR.
Frank A. Leisey
BY
Everett A. Johnson
ATTORNEY

March 15, 1960 F. A. LEISEY 2,928,774
AUTOMATIC TITRATION SYSTEM
Filed Aug. 31, 1953 3 Sheets-Sheet 2

INVENTOR.
Frank A. Leisey
BY Everett A. Johnson
ATTORNEY

INVENTOR.
Frank A. Leisey
BY
Everett A. Johnson
ATTORNEY

United States Patent Office 2,928,774
Patented Mar. 15, 1960

2,928,774
AUTOMATIC TITRATION SYSTEM

Frank A. Leisey, Chicago, Ill., assignor to Standard Oil Company, Chicago, Ill., a corporation of Indiana Application August 31, 1953, Serial No. 377,544

10 Claims. (Cl. 204—1)

This invention relates to method and apparatus for automatic titration and specifically for determining mercaptan sulfur in hydrocarbons.

In many processes it is important to measure quantitatively the proportion of known contaminants. For example, the efficient operation of petroleum refinery treating plants that remove mercaptan sulfur from light petroleum stocks requires a constant check on the mercaptan content of the product. Most methods of determining mercaptans have heretofore been based on a titration with volumes of an aqueous or alcoholic silver nitrate solution. The measurement of the mercaptan content was accomplished by volumetric analysis involving the addition to the test solution of a reagent of known concentration in known quantity sufficient to produce a stoichiometric reaction with the mercaptan which is usually referred to as bringing the test solution to an endpoint. Knowing the concentration and the volume of the added reagent, the concentration of the mercaptan could be ascertained. Such a method required the preparation, standardization, storage, controlled introduction and precise measurement of volumetric reagents.

The preparation of reliable standard solutions involves the expenditure of considerable effort and frequently the operator must employ indirect and time-consuming techniques. Furthermore, the changes in such solutions which often take place with the passage of time would change the characteristics of the reagent. Likewise, the difficulty in making precise measurement of the solution and failure to control the addition of the reagent introduced errors. These and other disadvantages tend to make the volumetric systems unreliable and not adaptable for plant control.

Electrical methods have been devised for determining the titration end-point but such still required adding volumetric titration reagents. Furthermore, each such method involves careful manipulation and interpretation of results by a highly skilled operator and was not adaptable to the determination of unusually low concentrations of mercaptan.

It is, therefore, a principal object of my invention to produce and introduce the titrating reagent in a manner which is controllable and reproducible and which avoids the difficulties inherent in any liquid volumetric system. Another object of my invention is to provide a method and means for the titration of mercaptans which eliminates the preparation, standardization, storage, controlled introduction and measurement of volumetric reagents.

It is a further object of my invention to minimize the number of steps required for making a titration of mertans and, in addition, it is an object to eliminate any need for standardized reagents and to avoid the difficulties resulting from the use of volumetric reagents.

Another object of my invention is to provide a method and means which lends itself readily to automatic control and regulation. More specifically, it is an object of my invention to provide an electrical method and system for generating reagents and for detecting the mercaptan end-point in a simple, accurate and rapid manner. A further object is to provide a method and system where the use of a liquid reagent is eliminated, titrations are rapid, and wherein unusually low concentrations of mercaptan can be measured. These and other objects of my invention will become apparent as the description thereof proceeds.

Briefly, my invention employs a coulometric method of electrically generating reagents within a titration cell and an aperometric method for detecting the mercaptan end-point. Silver ions are generated by a first pair of metal electrodes suspended in the titration cell. A constant direct current passed through the cell via these electrodes generates silver ions by oxidizing the anode. Generated silver ions are reacted with mercaptans present which reaction is substantially simultaneous with the generation of the silver ions. The presence of unreacted silver ions in the cell is detected and the generation of silver ions is terminated. Thus, the time of titration of the mercaptan is measured with reference to the time necessary to reestablish an initial low silver ion concentration. The generation time under these conditions is directly proportional to the silver ions produced.

A second pair of metal electrodes in the titration cell are connected to a galvanometer and battery in series. Initially, the galvanometer deflection is small, but a rapid increase occurs when the end-point of the mercaptan has been exceeded because of the diffusion current of excess silver ions. At the end-point, the increased galvanometer deflection directs a narrow beam of light onto a phototube which activates a relay. The relay then turns off the generation current to the first pair of electrodes and stops an electrical timer. The mercaptan content is proportional to the readings on the electrical timer or counter.

Further details of my invention will be described in connection with the accompanying drawings wherein.

Figure 1:
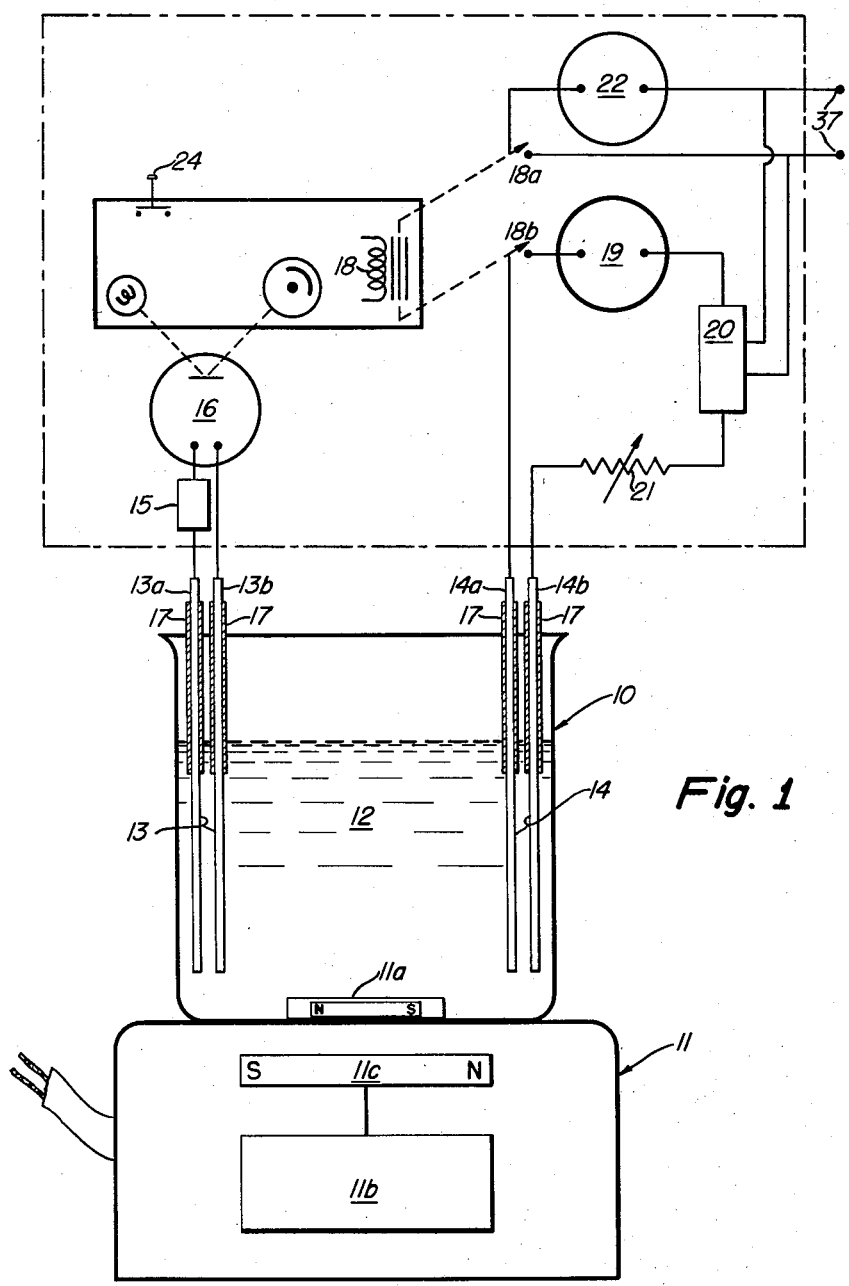
Figure 1 is a schematic diagram of the apparatus.

Referring to Figure 1 in the drawings, the titration cell 10 is illustrated as a 250 milliliter beaker. This is placed on a magnetic stirrer 11 with which Teflon-covered magnetic rod 11a is driven to agitate the titration mixture. The magnetic stirrer 11—11a is of the type wherein a constant speed motor 11b within the housing 11 drives a magnetized bar 11c. When the driven bar 11c and the free stirring rod 11a are magnetically coupled, a swirling action is imparted to the electrolyte 12 within the cell 10.

The solvent electrolyte 12 placed in the cell 10 is comprised essentially of 100 milliliters 95% ethanol, 50 milliliters benzene, approximately 0.5 gram ammonium or sodium nitrate (which may be 5 milliliters of a 1 molar aqueous solution), and 2 milliliters ammonium hydroxide.

Within the cell 10 are mounted two pairs of electrodes 13 and 14. The first pair of detection electrodes 13 comprises a cathode 13a and an anode 13b connected in series with a direct current source 15 of 0.1 to 0.5 volt and with a light deflection galvanometer 16 having a sensitivity of about 0.03 microampere per division. The electrodes 13a and 13b may be gold and platinum wires, respectively, 3 millimeters in diameter, spaced about 5 millimeters apart, and exposed to the electrolyte 12 in cell 10 for a depth of 35 millimeters.

The ion-generating system includes the pair of generating electrodes 14, the anode 14a being of silver and the cathode 14b suitably being of platinum. The electrodes 14a and 14b are of the same size, have the same exposed length and have the same spacing as defined in connection with the detecting electrodes 13a and 13b.

Sleeves 17 cover the upper portion of each of the electrodes in pairs 13 and 14 and extend below the surface of the electrolyte 12 thereby eliminating fluctuating galvanometer currents due to changing the effective electrode area as the electrolyte 12 is stirred. A suitable material for the sleeves 17 is a vinyl plastic coating.

The electrode pairs 13 and 14 are positioned in the titration cell 10 so that transient currents, induced in the detecting electrodes 13 by starting the coulometric current across electrodes 14, are minimized. This interference with the detecting electrodes 13 may be important at high coulometric currents, but it is negligible below 5 milliamperes. Currents as high as 10 milliamperes have been used with the indicated spacing without difficulty.

The generating electrodes 14 and the detecting electrodes 13 are located in the same plane and the pairs are spaced from each other as far as possible in the titration cell 10. It is contemplated, however, that I may provide an annular cell in which instance the electrode pairs 11 and 14 may be more closely spaced with the positive flow of electrolyte solution being successfully passed through the detecting electrodes 13 and then the generating electrodes 14.

The generating electrode pair 14 is connected in series with the relay 18, a milliammeter 19, a constant direct current source 20 and an adjustable rheostat 21. This circuit maintains the generator current constant since the generator cell resistance and change in cell resistance as the titration proceeds due to changing electrolyte conductance and cell polarization is very small in comparison to the high resistance of series rheostat 21. In the cell assembly described above, the value of rheostat 21 is greater than 100 times the resistance of the generator cell and the change in cell resistance has been found to be less than 1/10 the generator cell resistance. Rheostat 21 has been made adjustable so that any desired coulometric current up to 10 milliamperes can be selected.

At a coulometric current of one milliampere a maximum change in current of 0.05% has been observed and at five milliamperes a maximum change of 0.1% has been observed. Variations in the conductance of fresh batches of the electrolyte 12 and in the spacing of the electrodes 14a and 14b do not change the generating current.

The synchronous timer 22 is connected in series with contacts 18a of relay 18 and the power line. Pressing the titration push button 24 de-energizes relay 18 whose contacts 18a and 18b then start the ion-generating current across electrodes 14 and the synchronous timer 22.

Figure 3:
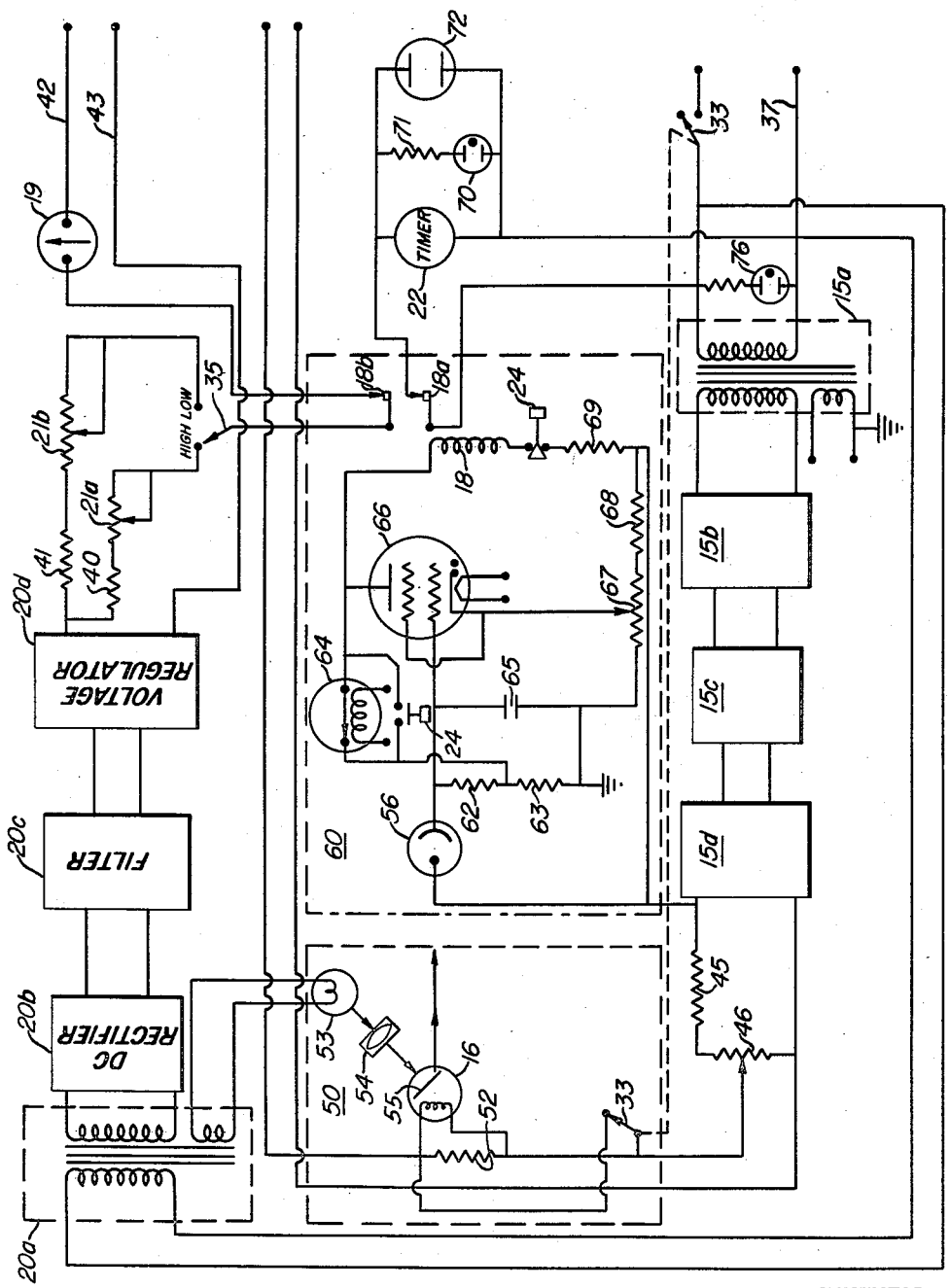
Figure 3 is a circuit diagram showing in more detail the electrical components of the apparatus illustrated in Figure 1.

Two coulometric current ranges, for example, set at 1 and 5 milliamperes, are provided in the titrimeter circuit of Figure 3. By employing the two ranges I may obtain better control in the low mercaptan range and decreased titration time in the high mercaptan range.

Figure 2:
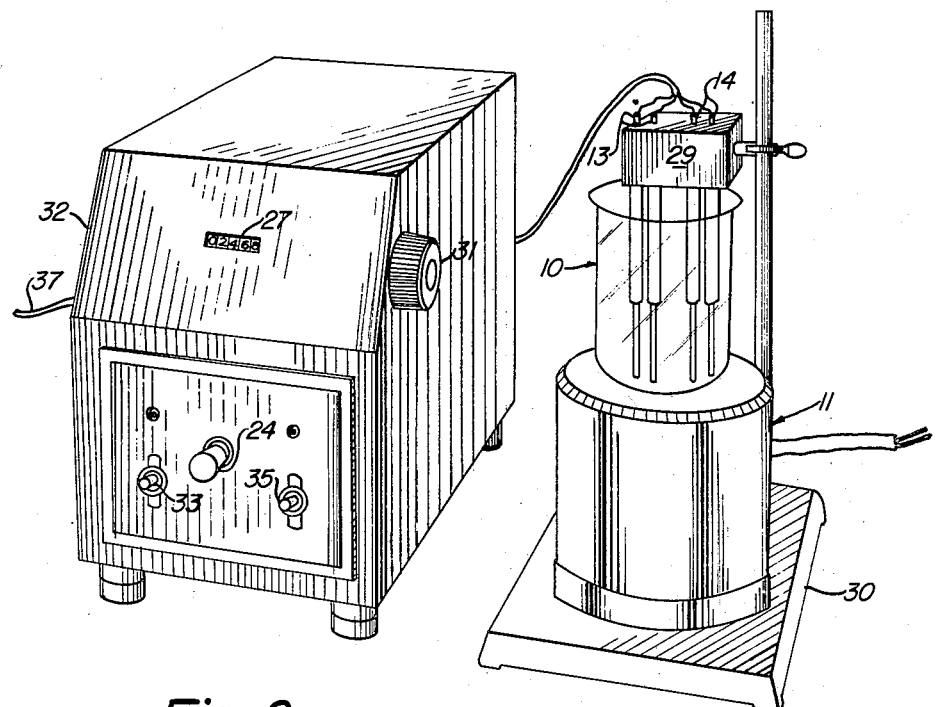
Figure 2 is a perspective of one installation employing one embodiment of the invention.

Referring to Figure 2, I have illustrated a typical installation which includes the magnetic stirrer 11, the titration cell 10, the generating electrode pair 14 and the detecting electrode pair 13 supported in block 29 which in turn is held by ring stand 30. The counter 27 is set to zero by knob 31. The face plate of the instrument case 32 includes the power switch 33, the titration push-button 24 and the range selector switch 35.

In Figure 3 I have illustrated in some detail the electrical circuit employed in the apparatus schematically illustrated in Figure 1 and disposed within housing 32 of Figure 2.

The coulometric D.C. power supply 20 (Figure 1) includes in the embodiment shown in Figure 3 the power transformer 20a, a selenium or vacuum tube rectifier 20b, resistance-capacitance filter 20c, and a voltage regulator 20d consisting of gas-filled cold-cathode type tubes. The output voltage of the voltage regulator 20d is constant at the operating voltage of the regulator tubes and should be at least 200 volts or more. In the embodiment shown in Figure 3, an output voltage of 216 volts is obtained. In the high coulometric current range this voltage is applied to resistor 40 and rheostat 21a in series with the selector switch 35, one set of contacts 18b of relay 18, current meter 19 and via lines 42 and 43 to the coulometric generation electrodes 14a and 14b. In the low coulometric current range, resistor 41 and rheostat 21b are selected by switch 35. Rheostats 21a and 21b can be adjusted so that any desired coulometric current up to 10 milliamperes can be preset and selected by switch 35.

The amperometric and relay D.C. power supply 15 (Figure 1) is generally similar to the coulometric power supply 20. It contains an isolation transformer 15a, a selenium or vacuum tube rectifier 15b, resistance-capacitance filter 15c, and a gaseous cold-cathode type voltage regulator tube 15d. The output of this power supply 15 is constant at 108 volts. Voltage dropping resistor 45 is in series with potentiometer 46 which adjusts the amperometric voltage to between 0 to 0.52 volt. Both power supplies 15 and 20 are connected to the 110 v. A.C. power line 37 through power switch 33. Another set of contacts on power switch 33 shorts out the galvanometer 16 when the instrument is turned off so as to prevent damage to it when the instrument is moved.

The amperometric galvanometer assembly 50 includes the light deflection galvanometer 16 on line 51 to the gold electrode 13a with galvanometer dampening resistor 52 across it. A lamp 53 directs a beam of light through the light focusing system 54 with the light beam impinging upon the mirror 55 of the galvanometer 16. With the end-point current passing through the electrodes 13 and galvanometer 16, the galvanometer is adjusted to direct the beam of light onto the phototube 56.

The phototube relay unit 60 includes the phototube 56 having load resistors 62 and 63 in series. A thermal delay switch 64 has contacts connected between the resistors 62—63 and to the coil on the relay 18. A filter condenser 65 is placed across the ends of the resistors 62 and 63. A relay tube 66 of the thyratron type is connected to the relay sensitivity potentiometer 67 which is in turn connected in series with the voltage dropping resistor 68. Current limiting resistor 69 has a terminal connected to the titration start push-button switch 24 which is normally closed. Titration stop switch 24 is connected across the thermal delay switch 64 for convenience. The relay sensitivity potentiometer 67 controls the sensitivity by adjusting the phototube bias voltage.

One set of contacts of relay 18 is connected to the electric timer 22. The other set of contacts is connected to the coulometric generation circuit. A neon lamp is a titration indicator pilot light 70 which is provided with a limiting resistor 71. An outlet socket 72 is provided for an external timer, lamp, alarm, etc. not shown.

Under normal operation conditions, the relay 18 is energized and this prevents the coulometric current from passing to the electrodes 13a and 13b and prevents the timer 22 from operating. When the instrument is first turned on, current from the amperometric power supply 15d flows through resistor 69, switch 24, relay 18, the thermal delay switch 64, load resistor 63, and back to the power supply. This current keeps the relay 18 energized during the instrument warm-up period and also causes the relay tube 66 to become conducting when it warms up to operating condition by applying a positive bias to its grid during the one minute period when the instrument is first turned on. This is controlled by thermal delay switch 64.

With electrolyte in titration cell 10, the amperometric detection current flowing through the galvanometer 16 causes it to deflect the galvanometer light beam off the phototube 56. The titration switch 24 can be momentarily pushed to start the coulometric current from 20d and operate the timer 22 by de-energizing the relay 18. The relay will remain de-energized until the galvanometer 16 deflects the light beam back to the phototube 56 (at the mercaptan reaction end-point when the amperometric current increases) again causing the relay tube 66 to conduct and again energize the relay 18.

To make a mercaptan determination, 150 milliliters of electrolyte 12 is placed in the titration cell 10. The electrode assemblies 13 and 14 are inserted and the power is turned on. Pressing the push-button 24 starts the titration by de-energizing the relay 18 which then starts the ion generating current through the generating electrode pair 14 and starts the synchronous timer 22 which has a counter 27 to show the generation time. The speed of the magnetic stirrer 11 is adjusted so that the electrolyte 12 is well circulated by the stirring rod 11a without entraining air bubbles.

Preliminary adjustments made when the titrator is first set up are as follows:

(A) The indicator voltage across the indicator electrode pair 13 is adjusted to about 0.25 volt. This is done by adjusting potentiometer 46.

(B) When the deflection of galvanometer 16 becomes steady, the galvanometer is adjusted to direct the reflected light beam 10 to 15 millimeters from the entrance slit of the phototube 56.

(C) The titration button 24 is pressed and the coulometric current through the generating electrode pair 14 is adjusted by means of rheostat 21a on high or 21b on low range to any desired value up to 10 milliamperes.

(D) Several titrations are run to condition the electrodes.

(E) The relation between titration time as indicated by the counter 27 and mercaptan content is determined by titrating a sample of known mercaptan content for the selected coulometric current to be used in generating silver ion from electrode pair 14.

Prior to introducing any sample into titration cell 10 and immediately before each determination, the titration button 24 is pressed. Silver ions are thereby generated in the electrolyte 12 until a fixed reference concentration is reached where the deflection of the galvanometer 16 automatically stops the silver ion generation. A 1 milliliter sample of unknown mercaptan concentration is then pipetted into the titration cell 10 and the titration button 24 is again depressed. When the timer 22 stops, the mercaptan sulfur content of the sample can be calculated by the equation:

$$M_x = \frac{(M_s)}{(T_s)} T_x$$

where:

$M_x$ = micrograms mercaptan sulfur in the unknown sample;
$M_s$ = micrograms mercaptan sulfur in the known sample;
$T_s$ = seconds required to titrate the known sample; and
$T_x$ = seconds required to titrate the unknown sample The ratio $M_s/T_s$ is constant for a given coulometric current and need be determined only once. For a given sample size the generation current can be adjusted so that the timer indicator (counter 27) reads directly in mercaptan content. For all samples the coulometric current and sample size can be selected so that a titration can be completed in 2 to 5 minutes.

Figure 4:
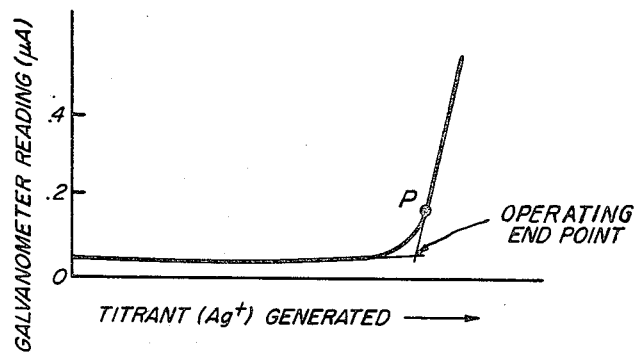
Figure 4 is a representation of a typical deflection curve indicating the production of excess silver ions.

During the course of a titration, the current in the amperometric detection system changes as shown in Figure 4. Once the increase in the deflection of galvanometer 16 occurs, the end-point has already been exceeded and a small error would be introduced into the determination. To eliminate this error and to make the system automatic, the reference current method mentioned above is used. Thus, before the sample is introduced into cell 10 silver ions are generated by electrode pair 14 until an arbitrary deflection of approximately 0.2 microampere is reached, such as point P in Figure 4. This corresponds to a blank run. The sample is then introduced and the mixture is again automatically titrated to this point. This procedure minimizes any titration error and eliminates the effects of different initial detector currents due to variations in the composition of the electrolyte 12.

Any substance that will react with silver ions in ammoniacal solutions to form insoluble precipitates may interfere with the titration. Examples of such substances are cyanides, iodides, sulfides, and thiosulfates. However, in the electrolyte described above, large amounts of chloride and small amounts of bromide do not interfere. Hydrogen sulfide can be removed from the mercaptan samples by shaking them with acidified cadmium sulfate solution prior to introducing the sample into the titration cell. The hydrogen sulfide content of a sample can be obtained by measuring the titration time of the sample before and after treatment with cadmium sulfate solution. The differential time is then proportional to the hydrogen sulfide present.

A large number of mercaptan titrations can be made with the same electrolyte. The response of the detecting electrodes 13a and 13b may become slow after long use, especially when samples with large proportions of mercaptans are titrated. Sensitivity can be resored by polishing the electrodes with steel wool, but in that event several titrations with mercaptans are necessary to condition the electrodes. A preferred cathode 13a is comprised of gold, however, sulfided silver electrode can be substituted although it is deteriorated by the presence of hydrogen sulfide.

Many titrations have been made employing my system and the repeatability obtained with this automatic titrator is much better than the repeatability obtained by the colorimetric method of analysis. For example, in Table I I have compared the repeatability of results obtained with the automatic titrator and with the colorimetric analysis method on six distillate-fuel samples.

TABLE I

*Repeatability of titrator and colorimetric results*

[Micrograms mercaptan sulfur per ml. distillate-fuel samples.]

| Sample | Automatic Titrator | | Colorimetric Method | |
|---|---|---|---|---|
| | Test 1 | Test 2 | Test 1 | Test 2 |
| A | 4.1 | 4.3 | 4.8 | 4.5 |
| B | 5.1 | 5.2 | 5.8 | 5.4 |
| C | 9.3 | 9.5 | 9.0 | 9.6 |
| D | 20.9 | 21.1 | 21.8 | 20.1 |
| E | 25.1 | 25.2 | 25.6 | 24.4 |
| F | 24.3 | 24.3 | 26.4 | 27.5 |
| | Standard Deviation: 0.011 | | Standard Deviation: 0.069 | |

Good agreement with the potentiometric method has also been observed on a large number of samples. Comparisons between automatic titrator values and potentiometric values on ten typical samples is shown in Table II.

TABLE II

*Comparison of titrator and potentiometric results*

[Micrograms mercaptan sulfur per ml. distillate-fuel samples.]

| Titrator: | Potentiometric |
|---|---|
| 2.8 | 2.8 |
| 8.5 | 8.4 |
| 14.3 | 14.2 |
| 23.2 | 22.8 |
| 35.2 | 34.2 |
| 46.5 | 45.6 |
| 57.0 | 57.0 |
| 112 | 111 |
| 165 | 166 |
| 277 | 276 |

Extensive use on many types of mercaptan samples has demonstrated that the automatic mercaptan titrator described herein is very satisfactory for routine laboratory use. Samples containing as little as 2 micrograms of mercaptan sulfur can be titrated.

A batch mercaptan titration has been described, but the instrument can titrate a flowing plant stream, automatically monitor instantaneous changes, make a continuous record of mercaptan content, and directly control mercaptan-treating operations. Thus, 1 milliliter samples of a plant stream may be taken at about three minute intervals and introduced into a titration cell operated in principle as described above. Any deviations from the selected mercaptan level would in turn be reflected by changes in the titration time. These changes in titration time can be converted into electrical impulses for controlling pumps, treating agent introduction, etc.

Although I have described my invention in terms of a specific form of apparatus, it should be understood that this apparatus and the described examples of operation are by way of illustration only and that my invention is not limited thereto. Accordingly, it is contemplated that those skilled in the art will make modifications in the apparatus and operation procedures in view of my disclosure without departing from the spirit of the invention.

What I claim is:

1. In quantitative analysis by titration involving the quantitative reaction in an electrolyte of a titrating agent with a constituent to be measured, the improvement which comprises regulating the amount of titrating agent present in the electrolyte by electrolytically generating the agent in situ, establishing a reference point of generated titrating agent, introducing the sample containing the constituent to be measured, conrolling the current employed in the electrolysis so as to effect the generation of the agent at a constant rate, sensing the presence of titrating agent in a concentration corresponding to at least the initially established reference point as an indication of the completion of the titration of said constituent, and determining the time necessary to complete such titration.

2. In quantitative analysis by titration involving the quantitative reaction of a titrating agent in an electrolyte with a qualitatively known constituent, the improvement which comprises pretitrating to a reference end point before addition of the constituent to the electrolyte, introducing the qualitatively known constituent, generating the titrating agent comprising silver ions at a constant rate by electrolysis in situ in such electrolyte, controlling the current employed in the electrolysis to give a constant rate of generation of titrating agent, titrating to said reference end point which end point indicates the true end point of the titration, amperometrically sensing the presence of silver ions in excess of that required to react stoichiometrically with such known constituent to re-establish said reference end point, and determining the length of time of generating silver ions at such constant rate necessary to produce excess silver ions.

3. The method of determining the concentration of a known constituent in the presence of an electrolyte which comprises the steps of establishing a selected low concentration of titrant ion as a reference end point preliminary to introduction of a sample containing a constituent to be determined, introducing a known volume of the sample into the electrolyte, generating titrant ions in the presence of the sample at a uniform rate and for a determinable time, reacting the generated titrant ions with the constituent present which reaction is substantially simultaneous with the generation of the titrant ions, amperometrically detecting the presence of unreacted titrant ions in said electrolyte above said reference end point and in excess of that necessary to react stoichiometrically with the said constituent therein, interrupting the generation of titrant ions in response to the detection of the presence of such unreacted titrant ions, and determining the duration of such titrant ion generation necessary to re-establish such low concentration of titrant ion, said duration being a measure of the concentration of the constituent in the sample under test.

4. The method of claim 3 wherein the titrant ions are silver ions and the amperometric detection of the presence of excess silver ions is effected by the flow of increased diffusion currents between a platinum electrode and a gold electrode.

5. In quantitative analysis by titration in the presence of an electrolyte the method which comprises the steps of establishing a selected low concentration of titration ion as a reference end point, introducing into the electrolyte a measured volume of a sample containing the constituent to be titrated, electrically generating titration ions in the presence of the said sample at a uniform rate and for a determinable time, titrating the constituent with the generated titration ions, the titration being substantially simultaneous with the generation of titration ions, amperometrically detecting the presence of unreacted titration ions in said electrolyte in a concentration corresponding to the initially established reference end point, interrupting the generation of titration ions upon the detection of such reference end point, and determining the duration of such generation necessary to re-establish such reference end point, said duration being a measure of the concentration of the constituent in the introduced sample.

6. In quantitative analysis by tritration involving the quantitative reaction in an electrolyte of a titrating agent with a constituent to be analyzed, the improvement which comprises regulating the amount of titrating agent present in the electrolyte by electrolytically generating the agent in situ, establishing a reference point of titrating agent, introducing the constituent to be analyzed, controlling the current employed in the electrolysis so as to effect the generation of the agent at a constant rate, amperometrically sensing the presence of a preselected concentration of titrating agent at least equal to said reference point as an indication of the completion of the titration of said constituent, and determining the time necessary to complete such titration.

7. In quantitative analysis by titration involving the quantitative reaction of a titrating agent in an electrolyte with a qualitative known constituent, the improvement which comprises generating the titrating agent at a constant rate by electrolysis in situ in such electrolyte, establishing a preselected concentration of titrating agent in said electrolyte, controlling the current employed in the electrolysis to give a constant rate of generation of titrating agent, amperometrically sensing the presence of titrating agent in said preselected concentration which is at least equal to that required to react stoichiometrically with such known constituent, and determining the length of time of generating titrating agent at such constant rate to result in such preselected concentration of titrating agent.

8. The method of utilizing the time of generation of a titrating agent at a constant rate for quantitative determination of a known reactive constituent in solution which comprises establishing a preselected concentration of titrant in a tritating zone, introducing a measured sample of unknown concentration into the titrating zone, coulometrically generating titrant electrolytically in said titrating zone at a constant rate, said titrant being reacted with the said reactive constituent until all of said constituent has reacted therewith and said preselected concentration of titrant is present, amperometrically detecting the presence of such preselected concentration of titrant, terminating the generation of titrant upon the detection of the presence of said concentration of titrant, and determining the length of time that such generation of titrant took place, whereby the time of such titration can be expressed in terms of the concentration of reactive constituent.

9. The method of claim 8 wherein the reactive constituent comprises mercaptans and the titrant is silver.

10. The analysis of claim 6 wherein the titrating agent comprises silver ions, and wherein the amperometric sensing of the reference point is effected by the flow of increased diffusion currents between a pair of electrodes to which a polarizing voltage is applied.

References Cited in the file of this patent
UNITED STATES PATENTS

| | | |
|---|---|---|
| 2,031,697 | Larrabee | Feb. 23, 1937 |
| 2,621,671 | Eckfeldt | Dec. 16, 1952 |
| 2,651,612 | Haller | Sept. 8, 1953 |

OTHER REFERENCES

D. DeFord: Analytical Chemistry, vol. 23, July 1951, pp. 938–940.

"Analytical Chemistry," vol. 19 (1947), pages 197–200 of article by Sease et al.; and vol. 23 (1951), pages 941–944 of article of DeFord et al.

Analytica Chimica Acta, vol. 2 (1948), pages 606–608; 615–617 of article by Kolthoff.